Jan. 3, 1933.   A. O. AUSTIN   1,893,319
ELECTRICAL PROTECTIVE APPARATUS
Filed June 1, 1928   2 Sheets-Sheet 1
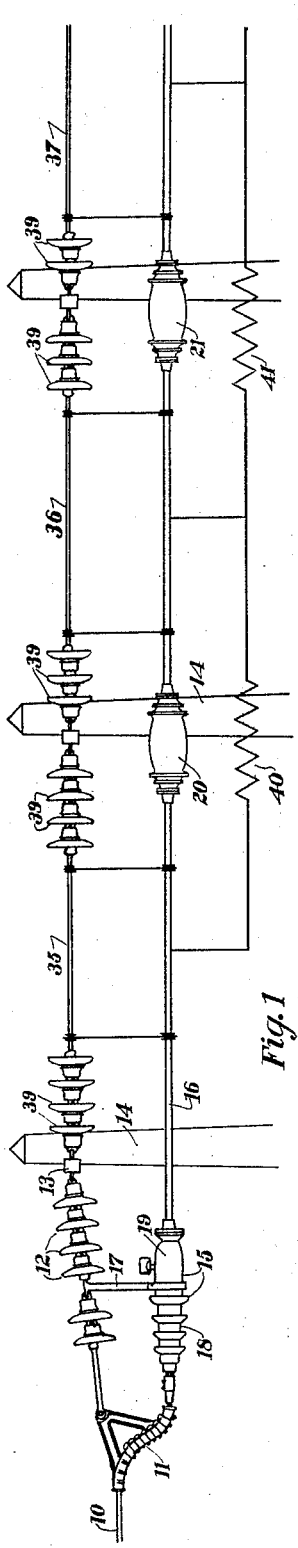
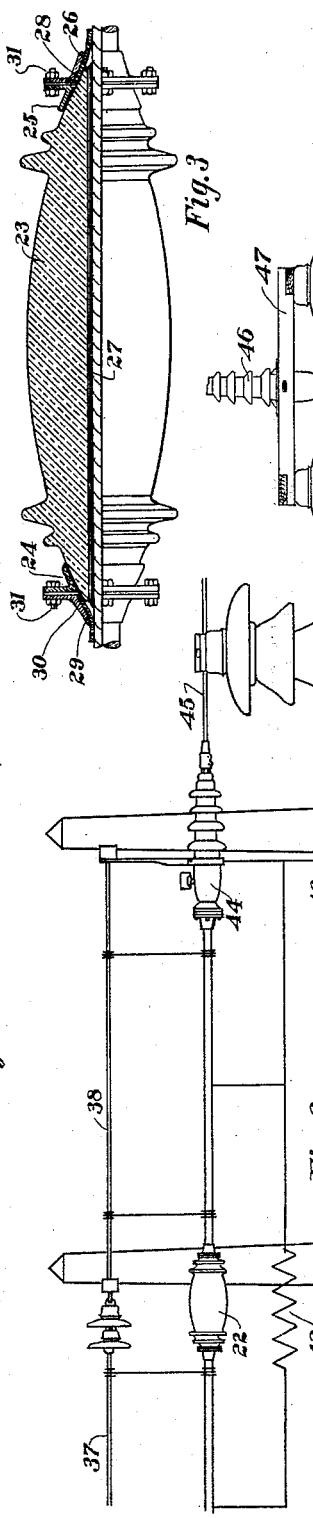
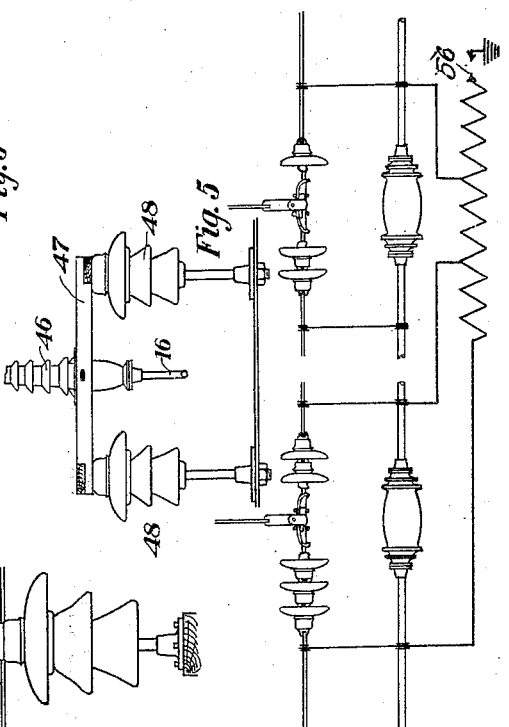
INVENTOR
Arthur O. Austin.
BY
ATTORNEY Jan. 3, 1933.  A. O. AUSTIN  1,893,319
ELECTRICAL PROTECTIVE APPARATUS
Filed June 1, 1928  2 Sheets-Sheet 2
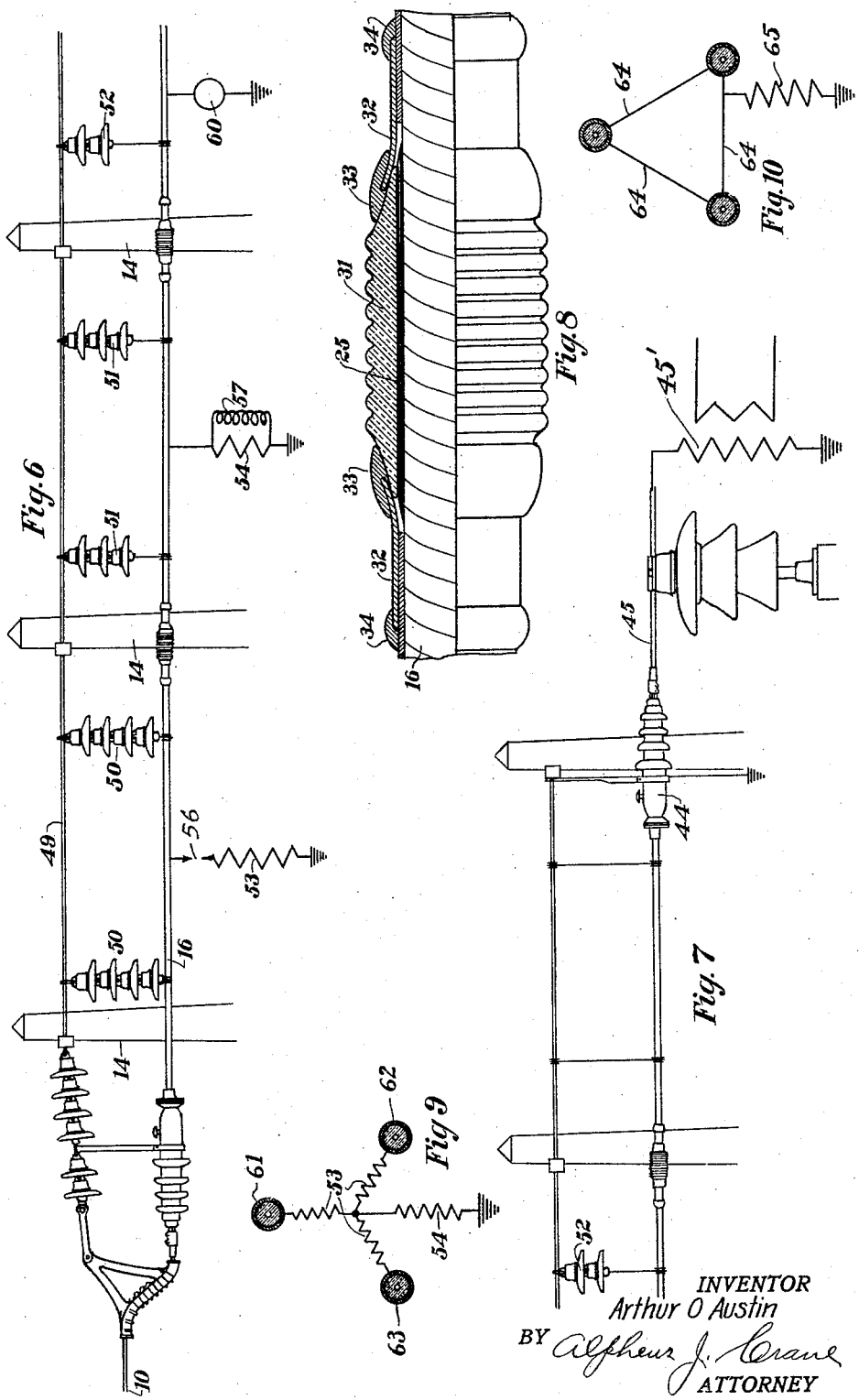
INVENTOR
Arthur O Austin
BY
ATTORNEY Patented Jan. 3, 1933

1,893,319

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

ELECTRICAL PROTECTIVE APPARATUS

Application filed June 1, 1928. Serial No. 282,213.

This invention relates to electrical protective apparatus and has for one of its objects the provision of means for protecting station apparatus from surges or other unusual disturbances on a transmission line. A further object of the invention is to provide a protective cable in which difficulties heretofore experienced with such cables will be reduced to a minimum. Another object is to provide an installation which will permit the use of potheads of reduced size and cost. A further object is to provide a protective installation which shall be of improved construction and operation. Other objects and advantages will appear from the following description.

The invention is exemplified in the combination and arrangement of parts shown in the accompanying drawings and described in the following specification and it is more particularly pointed out in the appended claims.

In the drawings:

Fig. 1 is a diagrammatic elevation of a portion of a protective installation showing one embodiment of the present invention.

Fig. 2 is a continuation of the installation shown in Fig. 1.

Fig. 3 is an elevation partly in section showing a sectionalizing insulator used in the present invention.

Fig. 4 is a view similar to Fig. 1 showing a slightly modified form of the invention.

Fig. 5 is a section on line 5—5 of Fig. 4.

Figs. 6 and 7 are views similar to Figs. 1 and 2 respectively showing another form of the invention.

Fig. 8 is a view similar to Fig. 3 showing a slightly modified form of the sectionalizing insulator.

Fig. 9 is a transverse section through three cables for a three-phase line.

Fig. 10 is a view similar to Fig. 9 showing a modified arrangement.

The protection of stations or sub-stations on transmission systems from lightning or surges having high frequency or steep wave front is one of the problems upon which much time and effort have been spent. Some systems have obtained a degree of protection from voltages coming in from an aerial transmission line by the use of a section of high voltage cable having a grounded sheath interposed between the transmission line and the station equipment. This arrangement has been found to be open to objection in some cases as the changed impedance between the aerial circuit and the cable circuit tends to cause a reflection of the wave. In other cases, the increased capacity due to the cable may tend to prolong the duration of surges or boost the voltage owing to the drawing of leading current over the reactance. A still further objection, in some cases, is due to the fact that a high voltage cable is likely to break down, owing to the magnitude of the surges.

My improved arrangement for utilizing a cable for absorbing of damping out transient voltages, which would otherwise damage the station or cable, minimizes the above difficulties and greatly increases the effectiveness of the cable as a protecting or absorbing means.

In Fig. 1 an aerial transmission line or conductor 10 is secured to a cable clamp 11, held by a dead-end insulator string 12 connected to a cross arm 13 on a support 14. The conductor 10 is connected to a high tension cable 16, having an internal conductor, an insulating covering and an outer lead sheath. The pothead 15 is suspended from the insulating string 12 by a link 17 and consists of an insulating section 18 and a metal section 19. The cable sheath of 16 is connected to the metal section 19 in any well known and approved manner. A suitable construction is shown in my prior application, Serial Number 2,752 filed January 16, 1925 or Serial Number 127,273 filed August 5, 1926.

It will be seen that the metallic member 19 is not supported directly from a grounded structure but is separated from the supporting structure 14 by a number of insulator sections 12. For this reason the electrical stress to which the pothead 15 is subjected is greatly reduced so that a much smaller and less expensive pothead can be used than is required where the conductor is led in through a pothead mounted directly on a grounded structure.

The cable 16 is a high voltage cable similar to that used on distribution circuits but may be of much lower voltage rating than the line rating, provided the installation is properly made.

The outer metal sheath of the cable 16 is divided into sections by sectionalizing insulators 20, 21 and 22. It will be apparent that potheads may be used for sectionalizing the cable sheath in lieu of the sectionalizing insulators. One form of sectionalizing insulator is shown in Fig. 3 which consists of a porcelain sleeve 23 having an opening therethrough of sufficient diameter to slide over the outside of the lead sheath. Rings 24 and 25 are cemented to the ends of the tube 23 and a clamping ring 26 is slid over the cable from one end past the point where the insulator is to be inserted. A section of the lead sheath is then removed and the exposed insulation may be wound with tape or cambric, as shown at 27, to a thickness substantially that of the lead sheath. The severed end 28 of the lead sheath is then flared outwardly and the sleeve 23 is moved into position until the pointed end of the sleeve extends inside the flared portion of the sheath. The opposite end of the sleeve is moved past the other severed end of the sheath which is then flared outwardly, as shown at 29. The sleeve 23 is then moved back a slight distance until the ends of the sleeve project beneath both of the flared portions of the sheath. The clamping rings 26 and 30 are then clamped into place by bolts 31, thus securing the ends of the sheath to the ends of the sectionalizing sleeve.

Another form of sectionalizing sleeve is shown in Fig. 8. In this form of sleeve a porcelain tube 31 has its outer surface adjacent the opposite ends of the tube metallized and both sections of lead tubing 32 are secured to the metallized ends of the porcelain tube by wiped joints 33. This construction is more fully described and claimed in my prior application, Serial Number 120,087 filed July 2, 1926. To install this form of sectionalizing insulator, a portion of the lead sheath of the cable 16 is removed and the exposed insulating covering wound with tape 27 as in the form previously described. The porcelain tube 31, with its lead sleeve 32, is then slid into place over the exposed section of cable and the ends of the lead tubes 32 are secured to the cable sheath by wiped joints 34.

The cable 16 and sectionalizing insulators may be supported by messenger cables 35, 36, 37 and 38. The sections of messenger cable are supported from poles 14 by insulator strings 39, the number of units in each string being decreased with each section of cable supported therefrom. The various sections of cable sheath are connected to ground through resistances 40, 41 and 42, the amount of resistance from the various cable sections to ground being decreased toward the station end of the conductor and the lead sheath of the last cable section may be connected directly to ground, as indicated at 43. The grounded sheath is connected to a pothead 44 and the cable conductor is connected from the pothead 44 by means of a conductor 45 to the station bus bar or other equipment 45' to be supplied.

Various arrangements of resistance between the cable sections and ground may be provided, the object being to form a cable which has effective graded capacity between the sheath and the inner conductor and a graded resistance to ground.

In the case of a high voltage transient disturbance entering the cable, the conductor will form a condenser with the cable sheath and will tend to draw charging current over the connecting resistance. Where the cable is a considerable distance above ground and the resistance to ground is high, the electrical properties of the first section of cable will not vary greatly from those of the connected aerial conductor. The next adjacent section of cable sheath is, however, connected to earth through a lower resistance and so on for the several cable sections, thereby changing the properties of the cable gradually.

As the charging current will increase directly as the frequency or steepness of the wave front and directly as the magnitude of the voltage, it will be seen that the current flowing over the resistances will increase very materially for disturbances set up by lightning or other severe transient conditions. This current flowing over the resistances will cause a dissipation of energy which will tend to damp out the high voltage disturbance, since the current flowing to the sheath under a high voltage disturbance, such as would tend to damage connected apparatus or insulation is usually of such a magnitude, compared to the current flowing to the sheath under the normal line voltage and frequency, that the losses will be very high under the transient conditions as compared to those under normal operating conditions. The energy dissipated in the resistances connecting the various cable sections to ground will, in general, be small enough, under normal operating conditions, that the loss may be neglected. Where the conditions are such that the losses in the resistances under normal operation are appreciable and it is desired to reduce these losses to a minimum, it is possible to insert a gap in the resistance circuit to ground which will be large enough so that it will not be bridged under normal operating conditions, but will be easily jumped with an increase in voltage or frequency. This arrangement is shown at 56 in Figures 4 and 6.

In some cases it may be advisable to use a reactance in shunt with the resistance, the reactance being of such an order that while normal frequency currents can flow to ground with little loss, a high voltage transient will be forced to cross the resistance. Such a combination of resistance and reactance is shown at 54 and 57 in Fig. 6 of the drawings.

In the modification shown in Figs. 4 and 5, the construction is similar to that shown in Fig. 1, except that the pothead 46 is mounted on a platform 47 carried by insulators 48. This permits the pothead to be carried in an upright position on a rigid support rather than suspended as in Fig. 1.

The construction shown in Figs. 6 and 7 is similar to that shown in Figs. 1 and 2, except that the messenger cable 49 is carried directly on the supports 14 and the sections of the cable 16 are suspended by insulators 50, 51 and 52, the amount of insulation being decreased toward the station-end of the cable. Resistances 53 and 54 of graded values are inserted between the cable sections and ground and reactance 57 shown in parallel with the resistance 54 for the purposes heretofore explained.

With a wave front equivalent to 1,000,000 cycles and an effective capacity of .007 mfd. a section of cable connected to ground through 100 ohms resistance can withstand a total impressed voltage of approximately 1,200,000 volts of which approximately 75% will be carried by the resistance. Energy will be absorbed at the rate of 3,000,000 k. w. From this it will be seen that where the impressed voltage and frequency are high, even comparatively small resistances connected to ground will absorb very heavy stresses tending to relieve the cable and in addition these resistances will absorb a large amount of energy, thus tending to dissipate the surges. Where the sections of the cable or capacity between conductor and sheath is small, it may be necessary to increase the resistance very materially in order to prevent a breakdown of the cable or to effect a suitable absorption of the surges in the resistance. In general, the resistances required will seldom exceed one to two thousand ohms in most practical installations. There are conditions, however, where advantage may be gained by using even higher resistances in order to relieve the cable or effect a finer gradation of stress. For larger capacities, the resistances may be reduced accordingly.

There are various ways of utilizing the principle of the invention to obtain beneficial results. Where the charging current from a cable sheath to ground would create an objectionable loss of energy in the resistance or ground impedance, this loss may be largely eliminated by connecting the sheaths of the several phases together for a corresponding zone, through a low resistance or a conductor of no appreciable resistance. This, in general, will place only the normal voltage stress upon the insulation of the cable. Where the cable is subjected to an abnormal stress, this potential is in general, between all phases and ground, hence, although a high resistance may be placed between the cable sheath and ground, a large current will not flow through the ground resistance except in the case of an abnormal electrical condition on the conductors.

One such arrangement is shown in Fig. 9. The conductor sheaths 61, 62, and 63 are connected through comparatively low resistance 53 and to ground through a higher resistance 54. With this arrangement, the dissipation of energy at normal frequency in the resistances will be small. In many cases the resistance between the conductor sheaths may be eliminated as in Fig. 10 by the use of jumpers 64 so that the only loss at normal frequency will be in the resistance 65 due to an unbalanced voltage to ground. It is evident that the cable sheath may be insulated from ground or supported in a variety of ways. In fact, where the electrical connections are made on the basis of Fig. 10, all three phases may be supported from the same set of insulators after the insulation of the cable becomes effective in separating the circuits.

It is evident that the scheme as shown may be used for other purposes in addition to that of protecting the station apparatus, such as forming a coupling capacity for electrostatic relays, synchronizing, or for carrier current work. Apparatus of this nature may be connected to the line through the condenser formed by the conductor and sheath where the resistance between the sheath and ground is small, as shown at 60 in Fig. 6.

With the scheme as shown, the insulation of the cable may be much lower than that normally used. This results in a much larger effective electrostatic capacity between conductor and sheath so that the cost of an installation providing a given amount of electrostatic capacity is greatly reduced. In some instances, the power factor may be corrected and the scheme is also applicable to the protection of underground cables from oscillations. In this case the main cable would take the place of the aerial 10 which in general corresponds to a conductor having a higher effective insulation. It, of course, is not necessary to use a cable of lower insulating value, but, in general, this scheme will provide the same protection with a cable of lower insulating value and cost as against an installation where the scheme is not used.

I claim:

1. A high voltage transmission line, station apparatus, a cable comprising a conductor, insulating covering for said conductor and an outer metal sheath, said conductor being electrically connected between said transmission line and station apparatus, said sheath being divided into sections spaced along said cable and insulated from one another, insulators for separating the various sections of said sheath from ground, said insulators being graded to withstand different voltages for the different sections of cable sheath and graded impedances interposed between said sheath sections and ground, the impedance between each section and ground being commensurate with the insulation of that section.

2. A transmission line, station apparatus connected with said line and a protective device conductively connected in series between said line and apparatus, said device comprising an armored cable the armor of said cable having sections thereof insulated from each other, an outlet housing connecting said line and cable, said housing comprising a metallic portion connected with one section of the armor of said cable, said section and housing being insulated from ground means for insulating said metallic portion from said transmission line, and means electrically connecting another section of the armor of said cable to ground.

3. A transmission line, a cable connected with said line having a conductor, an insulating cover for said conductor and an outer metal sheath, an outlet housing for said cable, means for insulating said outer metal sheath and said housing from ground, and impedance electrically connected between said metal sheath and ground.

4. A transmission line, a cable comprising a conductor, insulating covering for said conductor and an outer metal sheath, a pothead for connecting said cable conductor with said transmission line and for insulating said sheath from said transmission line, said transmission line and cable sheath being insulated from ground, the amount of insulation between said cable sheath and ground being less than the insulation between said transmission line and ground, and impedance interposed between said cable sheath and ground.

5. A transmission line, a cable comprising a conductor, insulating covering for said conductor and an outer metal sheath, an outlet housing for connecting said cable conductor to said transmission line and for insulating said outer metal sheath from said transmission line, means for dividing said outer metal sheath into sections spaced longitudinally of said cable and insulated from one another, means for insulating said transmission line and cable sheath sections from ground, the amount of insulation between each cable sheath section and ground being decreased as said sheath sections are spaced away from said transmission line, and impedance interposed between said sheath sections and ground, the amount of impedance between each section and ground increasing as said sections are spaced from said transmission line.

6. A high potential transmission line, station apparatus, a cable comprising a conductor, insulating covering for said conductor and an outer metal sheath, said conductor electrically connecting said transmission line with said station apparatus, a pothead for connecting said transmission line with the conductor of said cable and for insulating said sheath from said conductor and transmission line, sectionalizing insulators for dividing said sheath into sections spaced longitudinally of said cable, insulating supports for said transmission line, pothead and cable, the insulation for said transmission line being greater than the insulation for said pothead and the insulation for each section of said cable sheath being greater than the insulation of the next adjacent section toward said station apparatus, the sheath of the endmost section adjacent said station apparatus being grounded, and impedance interposed between ground and each of said cable sheath sections, except the section next adjacent said station apparatus, the impedance between each cable sheath section and ground being greater than that for the cable sheath section next adjacent thereto on the station side thereof.

7. The combination with a transmission line of a protective device for said line comprising separated capacitance members distributed along said line and conductors electrically connecting said capacitance members to ground, the impedance of said conductors being graded for the different capacitance members distributed along said line.

8. The combination with a transmission line, of capacitance members insulated from one another and associated with said line to form therewith the elements of condensers, and means connecting the outermost one of said capacitance members to ground through impedance while an inner capacitance member is connected to ground through less impedance.

9. The combination with a high potential transmission line, of a plurality of capacitance members distributed along said line and insulated from one another, graded impedances electrically connected between said members and ground, the impedance connected between the member and ground adjacent the outer end of the line being greatest, while the impedance between the member adjacent the inner end of the line and ground is substantially zero.

10. The combination with a transmission line of apparatus connected with said line, a cable interposed between said line and apparatus comprising a conductor, an insulated covering for said conductor and an outer metal sheath, said sheath being divided into sections distributed longitudinally of said cable and insulated from one another and graded impedances interposed between the respective sections of said cable and ground, the impedances decreasing from the end of said cable adjacent said line toward the end thereof connected with said apparatus.

11. The combination with a high potential transmission line, of a cable comprising an inner conductor connected to said line, an insulating covering for said conductor and an outer metal sheath, said cable being divided into sections having graded capacities for the different sections between said inner conductor and outer metal sheath.

12. The combination with a high potential transmission line, of a cable for connecting said line with station apparatus, said cable comprising a plurality of sections, each having an inner conductor, an insulating covering for said conductor and an outer metal sheath, the sheaths of the various sections being grounded through resistances of graded values for the different sections.

13. The combination with a high potential transmission line, of a cable for connecting said line to station apparatus, said line comprising an inner conductor, an insulating covering for said conductor and an outer metal sheath, said sheath being divided into sections spaced longitudinally of said cable and insulated from one another, graded resistances interposed between the sections of said sheath and ground, and electrical apparatus connected to said transmission line through the capacitance of one of said sheath sections and said inner conductor.

14. The combination with a transmission line and station apparatus connected with said line, of a protective device for said station apparatus comprising an armored cable electrically connected between said line and apparatus, the armor of said cable being divided into sections insulated from each other, the section of said armor adjacent said line being insulated from ground and the section of said armor adjacent said apparatus being grounded.

In testimony whereof I have signed my name to this specification this 26th day of April A. D. 1928.

ARTHUR O. AUSTIN.